(12) United States Patent
Hansen

(10) Patent No.: US 6,733,273 B1
(45) Date of Patent: May 11, 2004

(54) DEVICE FOR PRODUCING EXTRUSION BLOW-MOLDED CONTAINERS WITH AT LEAST TWO CHAMBERS

(76) Inventor: Bernd Hansen, Talstr. 22-30, D-74429 Sulzbach-Laufen (DE)

(*) Notice: Subject to any disclaimer, the term of this patent is extended or adjusted under 35 U.S.C. 154(b) by 5 days.

(21) Appl. No.: 09/959,270

(22) PCT Filed: Jun. 7, 2000

(86) PCT No.: PCT/EP00/05224

§ 371 (c)(1),
(2), (4) Date: Oct. 19, 2001

(87) PCT Pub. No.: WO00/76745

PCT Pub. Date: Dec. 21, 2000

(30) Foreign Application Priority Data

Jun. 9, 1999 (DE) .......................... 199 26 329

(51) Int. Cl.[7] .............................. B29C 49/04
(52) U.S. Cl. ...................................... 425/532
(58) Field of Search ........................... 264/540; 425/532

(56) References Cited

U.S. PATENT DOCUMENTS 4,655,987 A    4/1987  Zertuche

FOREIGN PATENT DOCUMENTS

| DE | 1179356 | 10/1964 |
| JP | 56019732 | 2/1981 |
| JP | 61171321 | 8/1986 |
| JP | 62162517 | 7/1987 |
| WO | 9726126 | 7/1997 |

Primary Examiner—Suzanne E. McDowell
(74) Attorney, Agent, or Firm—Roylance, Abrams, Berdo & Goodman, LLP

(57) ABSTRACT

A device produces containers having an inner space divided into separate container chambers by at least one separating wall. An extruder extrudes a tube of a plasticized synthetic material from an annular gap between an outer nozzle ring and an inner nozzle core. The nozzle core is provided with a guide for synthetic material that is branched off from the annular gap. At at least one outlet port at one nozzle end, the branched-off synthetic material is issued and forms a continuous separating wall that extends within the extruded tube. The guide for the branched-off synthetic material is positioned in a zone of the annular gap located upstream of and at a distance form the outlet end of the outlet port.

8 Claims, 6 Drawing Sheets

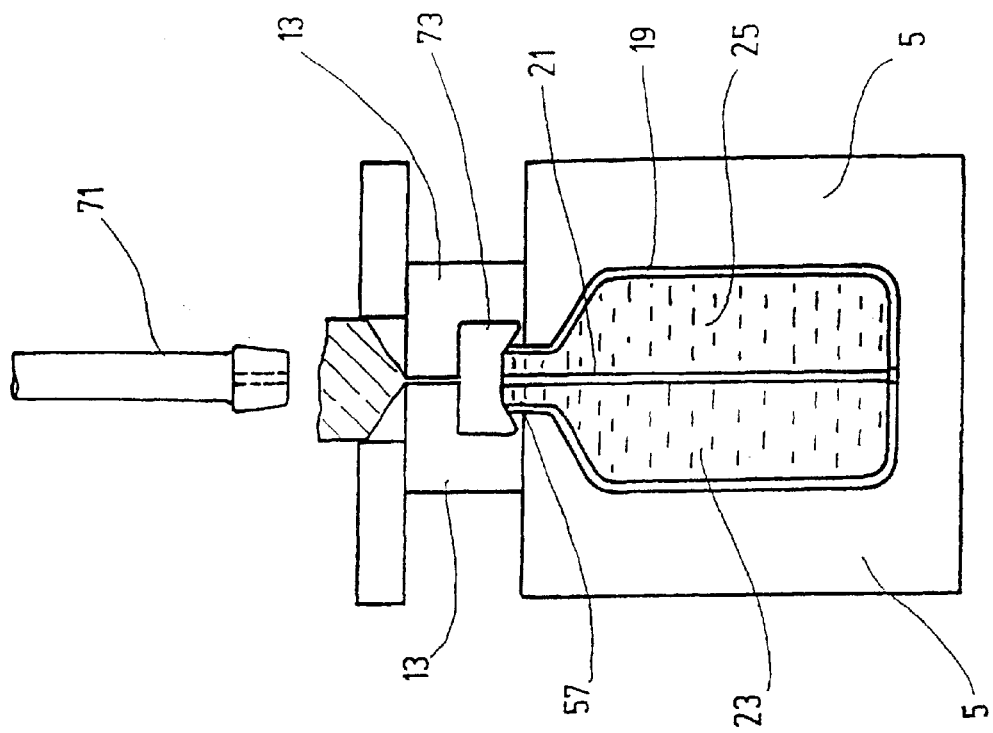
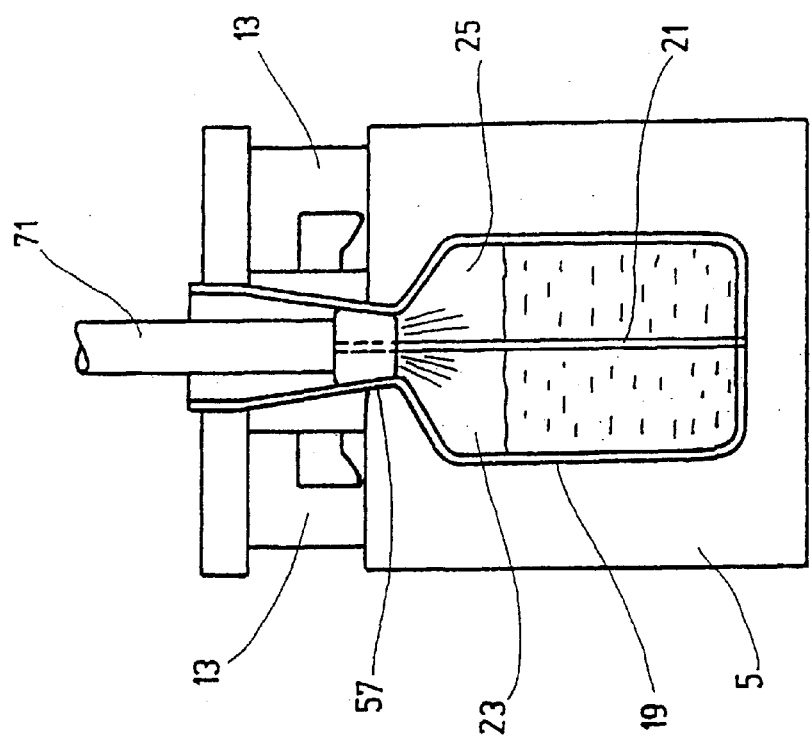

DEVICE FOR PRODUCING EXTRUSION BLOW-MOLDED CONTAINERS WITH AT LEAST TWO CHAMBERS

FIELD OF THE INVENTION

The present invention relates to a device for producing containers, with an interior divided by at least one partition into separate container chambers. An extruder extrudes a tube of plasticized synthetic material from the annular gap between the outer nozzle ring and the inner nozzle core. The inner nozzle core has a guide for the synthetic material branched off out of the annular gap and at least one end-side outlet slot from which the branched-off synthetic material emerges as a partition. The partition extends continuously within the extruded tube. A welding and molding means closes the end of the tube by welding. By producing a pneumatic pressure gradient acting on the tube, the tube is expanded and is placed against the molding wall of the molding to form the container.

BACKGROUND OF THE INVENTION

A device for producing a container divided by a partition into separate container chambers is disclosed in DE 1 179 356 A1. The guide for the synthetic material forming the inner partition, in the known device, has a direct connection between the downstream outlet opening of the annular gap and the outlet slot of small depth which extends diametrically in the nozzle core. Even if the friction conditions which prevail in the end area of the annular gap are kept within narrow limits to a corresponding setpoint, a uniform, desired material thickness of the partition formed can hardly be maintained in operation. When to improve the flow conditions, the outlet slot is formed with an enlarged cross section from its middle to both ends, thereby to the branching sites on the annular gap, the danger exists that the partition formed in the central area has a smaller thickness than in the edge areas.

SUMMARY OF THE INVENTION

An object of the present invention is to provide a device for producing a container with an interior divided by at least one partition into separate container chambers, characterized by an improved operating behavior.

This object is achieved in the present invention by a guide for the branched-off synthetic material placed in the area of the annular gap which is located upstream at a distance from the outlet end of the outlet slot.

In this manner, the branching site for the synthetic material is located in an area of the annular gap, upstream relative to the mouth area. Therefore, the area in which the plastic column is moving towards the downstream outlet opening has a considerable pressure gradient. By simply choosing the distance between the branching site and the outlet opening, the desired optimum flow conditions are established for the synthetic material entering the slot. By using the higher pressure level prevailing upstream of the outlet opening, the desired supply of the outlet slot for the partition to be formed can then be guaranteed for the respective viscosity properties of the extruded synthetic material.

In one advantageous embodiment, the nozzle core, as the guide for the branched-off synthetic material supplied to the outlet slot, can have at least one transverse hole as a connection between the annular gap which surrounds the nozzle core and the respective outlet slot. To adapt to the different conditions, only nozzle cores with differently arranged and dimensioned transverse holes need to be prepared to satisfy the different material properties.

In another advantageous embodiment, the nozzle core has a core tip which is screwed to it on the end side with a central screw union. The outlet slot is formed in the core tip. The surfaces of the core tip and of the following part of the nozzle core facing one another form a funnel surface and a conical surface which surrounds the central screw union. They are located at a distance from one another, and form an inlet area extending obliquely to the lengthwise axis of the nozzle and surrounding the screw union core as the guide for the synthetic material to be branched off from the annular gap and to reach the outlet slot via assigned passages in the core of the screw union. In one such embodiment, adaptation to different circumstances is made especially simple by only the core tip being replaced or its being screwed to the following part of the nozzle core. The desired change of the cross section of the inlet area arises between the funnel surface of the core tip and the opposite conical surface.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIGS. 7 to 9 are side elevational views of the device of FIG. 6, with the blowmold being closed and in different process steps in the formation, filling and closing of the container, respectively.

DETAILED DESCRIPTION OF THE INVENTION

Figure 1:
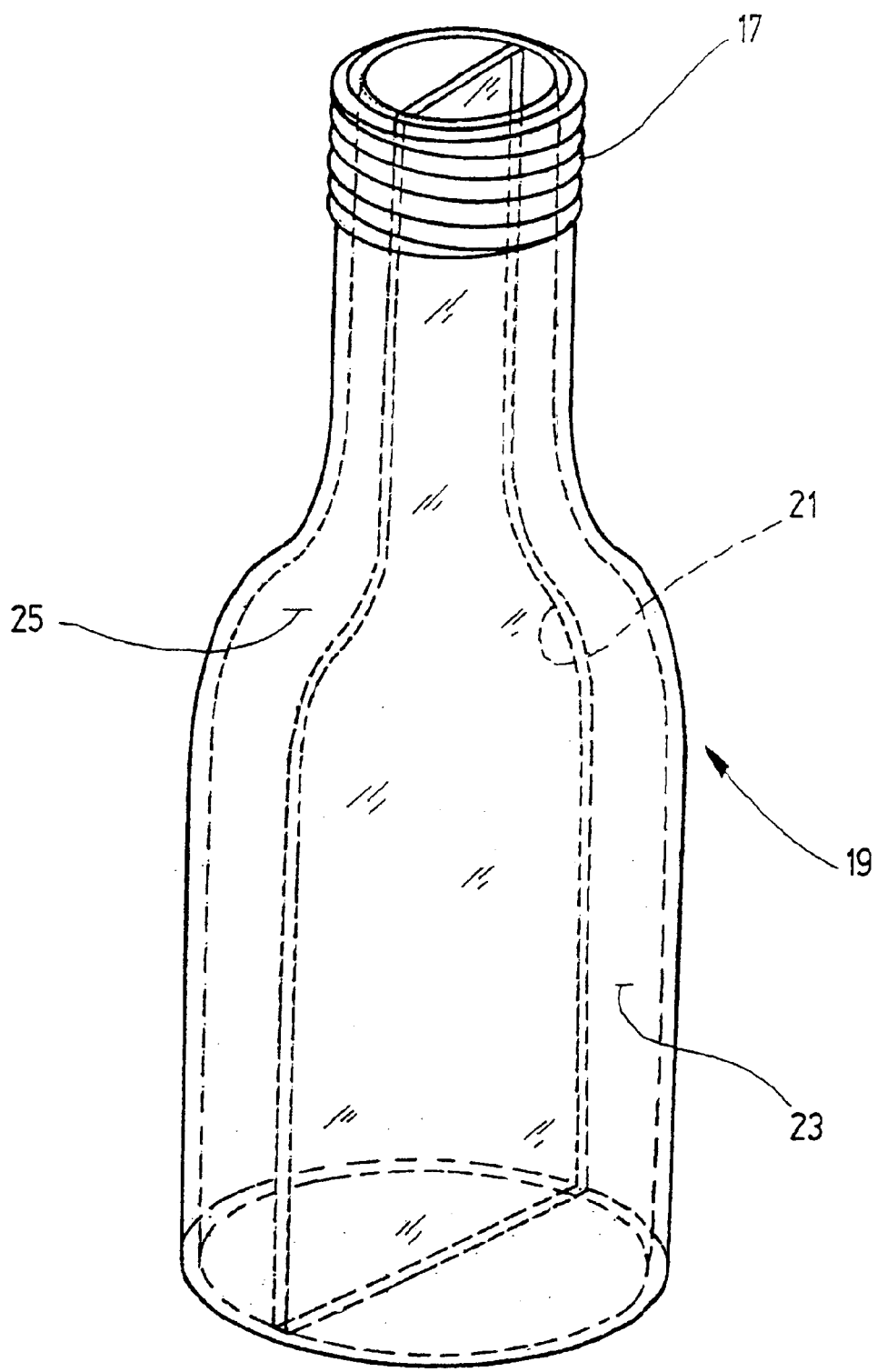
FIG. 1 is a perspective view of a two-chamber container produced by a device according to the present invention, without the contents added.
Figure 2:
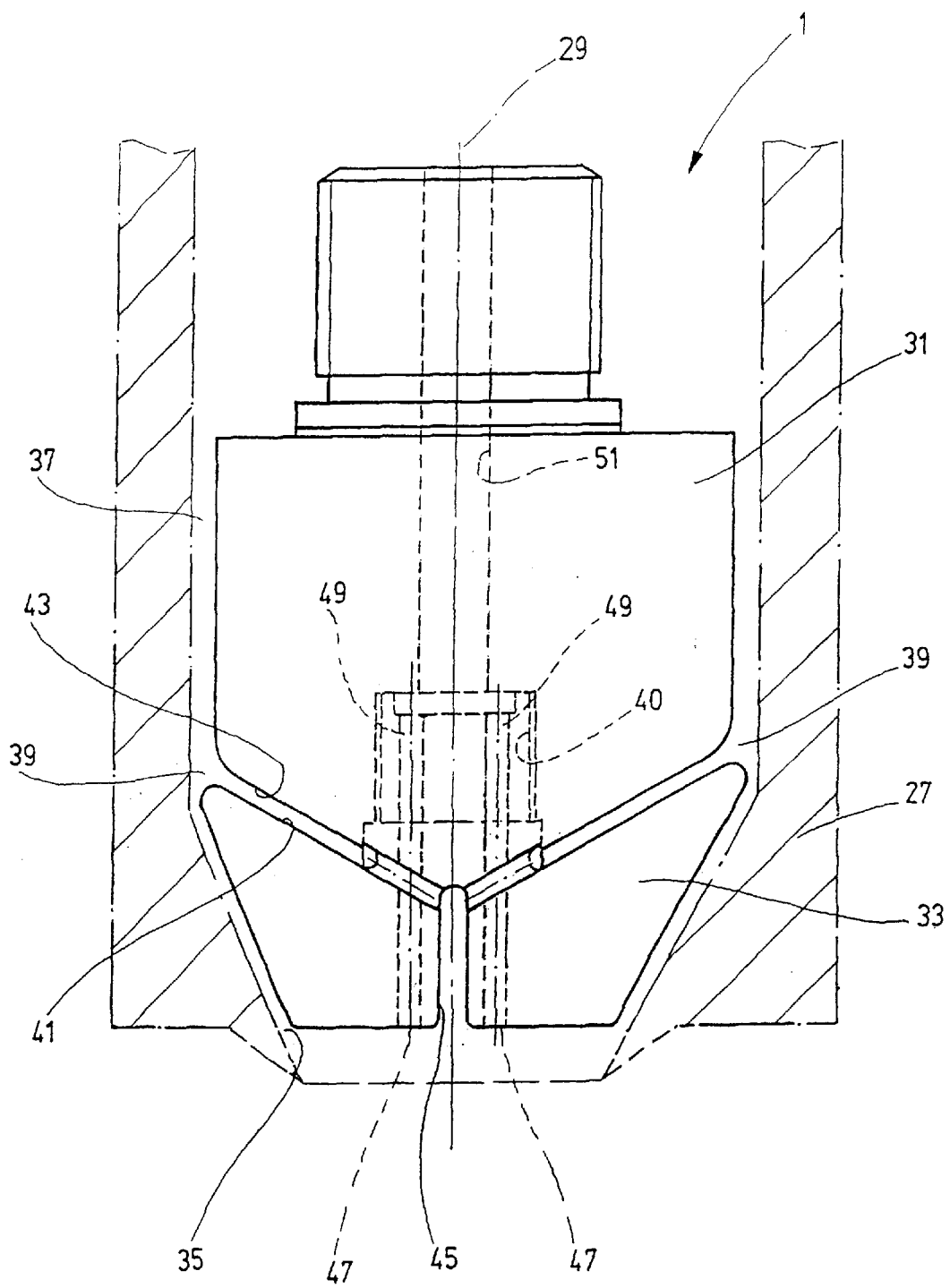
FIG. 2 is a schematically simplified, side elevational view in section of a nozzle arrangement of an extruder unit for the device according to a first embodiment of the present invention.
Figure 3:
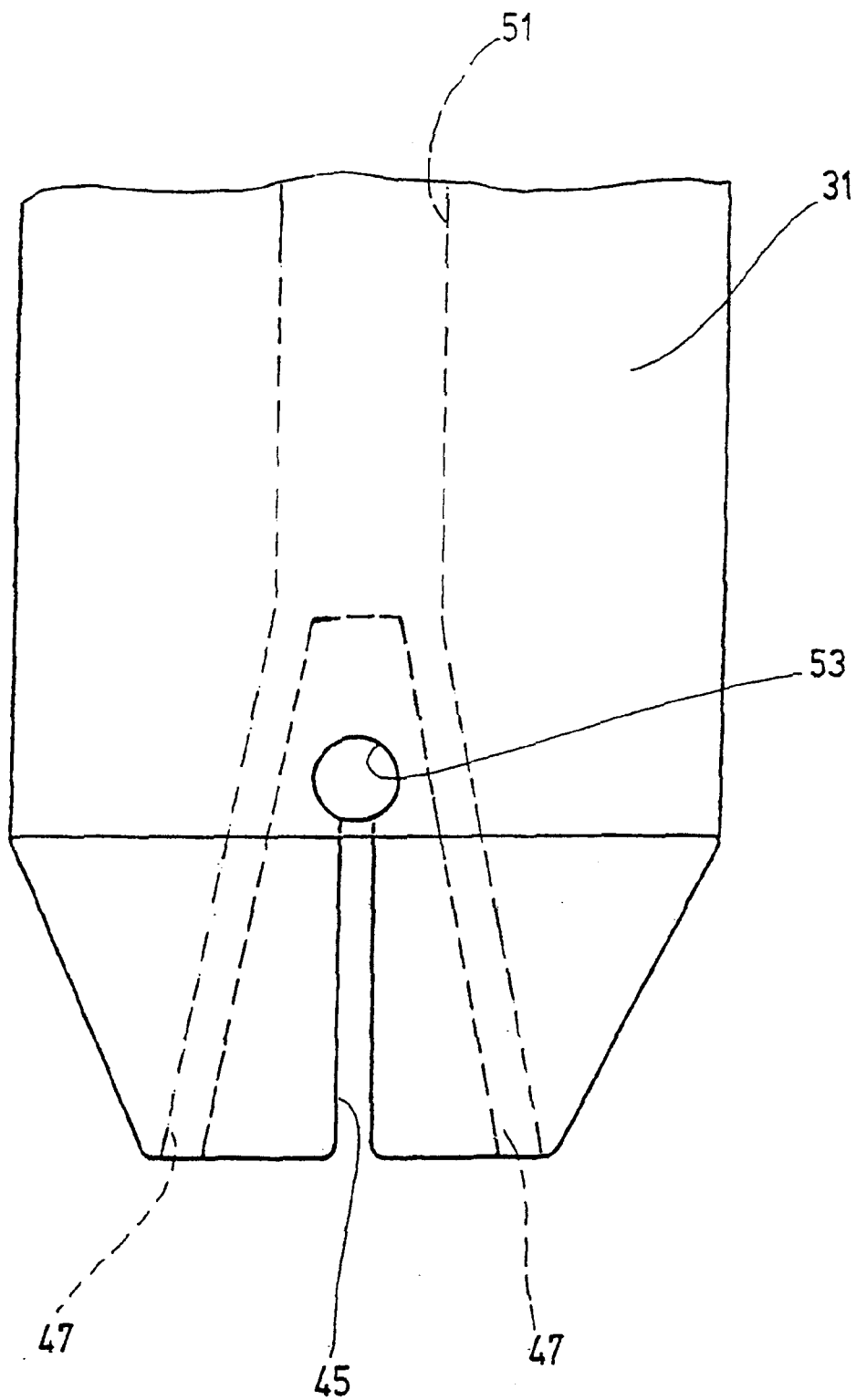
FIG. 3 is an opened and schematically simplified side elevational view of a nozzle core of an extruder means for the device according to a second embodiment of the invention.

FIG. 1 shows in schematic form a container 19 produced by a device according to the present invention. The container has a continuous inner partition 21 which divides the interior of the container 19 into two chambers 23 and 25 separated fluid-tight from one another. FIGS. 2 and 3 show the important parts of an extruder 1 which interacts with a blow mold (not shown in these figures) and forms embodiments of the device of the present invention, for producing a container 19, having a inner partition 21, as shown in FIG. 1.

FIG. 2 shows the end of the extruder 1 facing a blow mold (not shown). A nozzle ring 27 of the extruder receives a nozzle core 31 located coaxially to the lengthwise axis 29 of the nozzle. The tip 33 of the nozzle core, with the end area of the nozzle ring 27, defines an annular outlet 35 from which extruded synthetic material emerges in the form of a tube. The molten synthetic material reaches the outlet 35 via an annular gap 37 formed between the nozzle ring 27 and the nozzle core 31. As can be seen from FIG. 2, this annular gap 37 narrows at the transition between the core tip 33 and the part of the nozzle core 31 which follows upstream so that a retaining area 39 for the supplied synthetic material results.

The core tip 33 is screwed to the following, upstream part of the nozzle core 31 via a pin having an outside thread 40. The surfaces of the core tip 33 facing one another and the following part of the nozzle core 31 are located at a distance from one another. The corresponding surface of the core tip 33 forms a funnel surface 41. The facing surface of the remaining nozzle core 31 defines a conical surface 43. These surfaces 41 and 43, in the example shown, include an angle of incline of 65° or 60° relative to the lengthwise axis 29 of the nozzle, and form between themselves a guide for the synthetic material branched off from the annular gap 37. The synthetic material enters at the branch site formed on the retaining area 39 between the surfaces 41 and 43. Through the holes in the pin of the core tip 33, which has an outside thread 40, this branched-off synthetic material travels into an outlet slot 45 formed on the front side of the core tip 33. From there, the branched-off synthetic material emerges as a web extending crosswise within the extruded tube. After expansion of the tube, the web forms the partition 21 in the molded container 19 (FIG. 1). On either side next to the outlet slot 45, i.e. on both sides of the plastic web emerging from the outlet slot 45, in the end surface of the core tip 33, there is one outlet opening 47 each for support air. The openings are connected to a central air channel 51 via branch lines 49 formed in the pin having the outside thread 40.

The air supplied from the air channel 51 via the outlet openings 47 is intended as support air which simply prevents the collapse of the extruded tube and its cementing to the web which forms the partition 21. The container is expanded in the blow mold in an additional working step by means of a blowing and filling mandrel. In an analogous arrangement to the outlet openings 47 of the core tip 33, the blowing and filling mandrel has blow openings for supply of expanding, preferably sterilized blowing air. These blow openings can also be used as fill openings for supply of contents to the container chambers 23, 25.

FIG. 3 shows the front end section of a modified nozzle core 31, without the nozzle ring 27 which surrounds it. In contrast to the above described example, the nozzle core 31 does not have a front core tip screwed on to form a guide for the synthetic material to be branched off in cooperation with the following part of the nozzle core. Rather, in the embodiment of FIG. 3, for the guide, a direct connection is between the end-side outlet slot 45 and the annular gap which surrounds the nozzle core 31 via transverse holes 53. Holes 53 extend in the nozzle core 31 transversely to the lengthwise axis and are connected to the inner, i.e. upstream, end of the outlet slot 45. The number and cross section of the transverse holes 53 are chosen such that the desired amount of synthetic material which has been branched off from the outer annular gap emerges from the outlet slot 45 as the web which extends crosswise within the tube and which forms the partition 21. As in the above described embodiment, on either side next to the outlet slot 45 outlet openings 47 are provided for the support air supplied from the central air channel 51.

In both embodiments shown in FIGS. 2 and 3, the thickness of the web emerging from the outlet slot 45 can be adjusted by choosing the ratio between the nozzle gap, i.e. the width of the annular gap 37 formed within the nozzle ring, and the width of the outlet slot 45. In the example of FIG. 2, the distance between the funnel surface 41 and the conical surface 43 can also be varied for this adjustment. Likewise, the amount of narrowing of the gap on the retaining area 39 can be varied.

Reference is made to FIGS. 6 to 9. The container 19 produced using the device of the present invention can, if so desired, be filled like conventional single-chamber containers while still within the blow mold 5 and before the head-side, top welding jaws 13 are moved together on the blow mold to mold the container neck 57 on the end side and optionally close it by welding. As indicated above, the two-chamber container 19 can be filled by a combined blowing and filling mandrel or by a filling mandrel which performs only the filling function. For each of the container chambers 23 and 25, the mandrel has an outlet opening for the contents. The mandrel output openings are arranged offset in the same way relative to the lengthwise axis of the filling mandrel, as for the outlet openings 47 for support air on the nozzle core 31 of the extruder 1. The outlet openings 47 discharge on either side next to the outlet slot 45 which forms the partition 21.

As mentioned above, the shaping of the neck of the container produced using the process of the present invention is performed by top movable welding jaws 13 on the pertinent blow mold, see FIGS. 6 to 9. In the example of the container 19 shown in FIG. 1, the outside thread 17 is produced for a closure in the form of a screw cap (not shown) which closes both container chambers 23 and 25.

Figure 4:
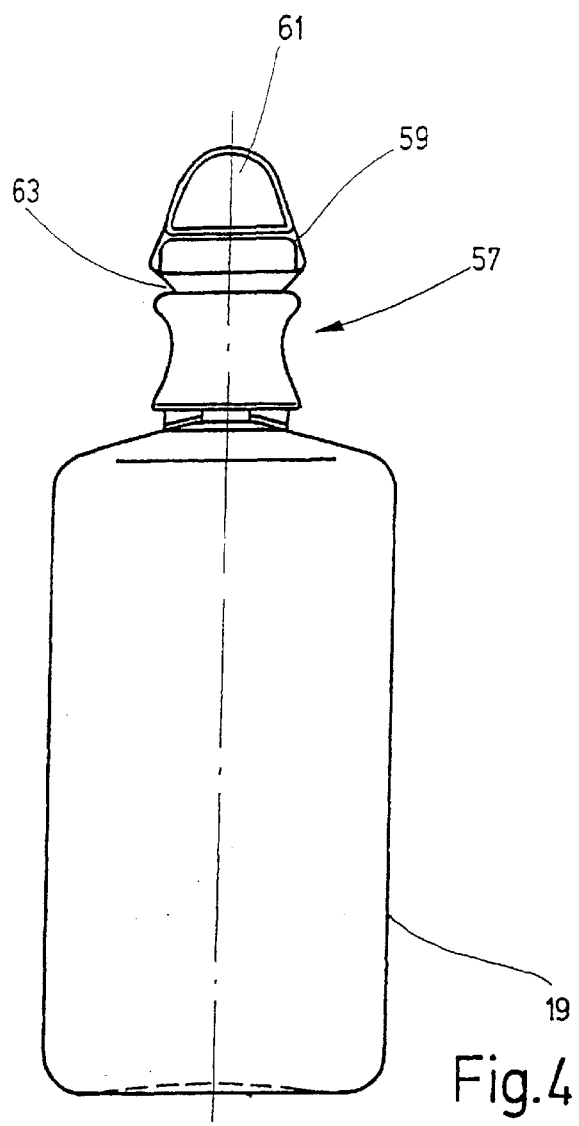
FIG. 4 is a side elevational view of a two-chamber container in which a closure for both chambers is molded onto the container neck and can be opened by a twist-off lock produced by a device according to the present invention.
Figure 5:
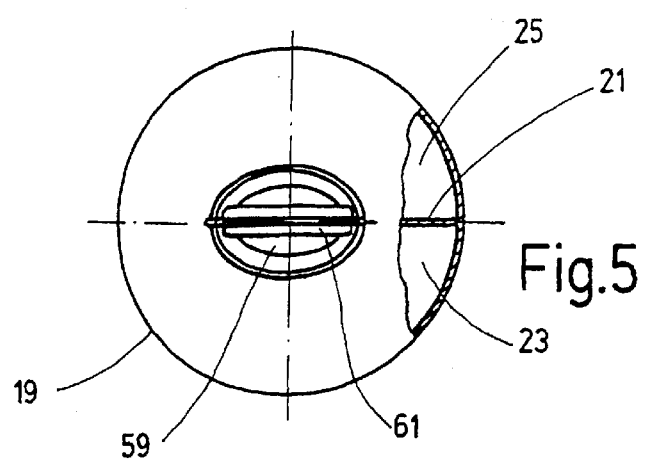
FIG. 5 is a top plan view, partially in section of the container of FIG. 4.

Instead of making one such screw closure, a different type of closure can be made by the upper welding jaws 13 in the shaping of the container neck, as is known in the pertinent technology for single-chamber containers, for example, according to the bottelpack® system. As is shown in FIGS. 4 and 5, a rotary lock closure can be molded on the container neck 57. The welding process is carried out such that the two chambers 23 and 25 are closed by a twist-off lock 59. Lock 59 can be separated at a disconnect 63, formed as a scored site, by the lock being turned using its molded-on handle piece 61.

Figure 7:
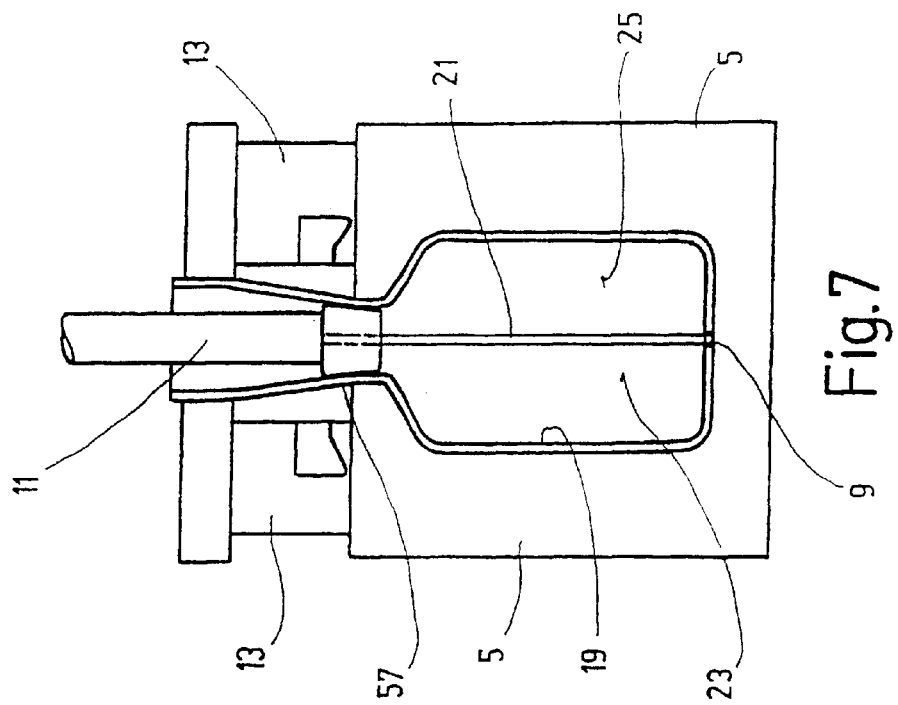
Figure 6:
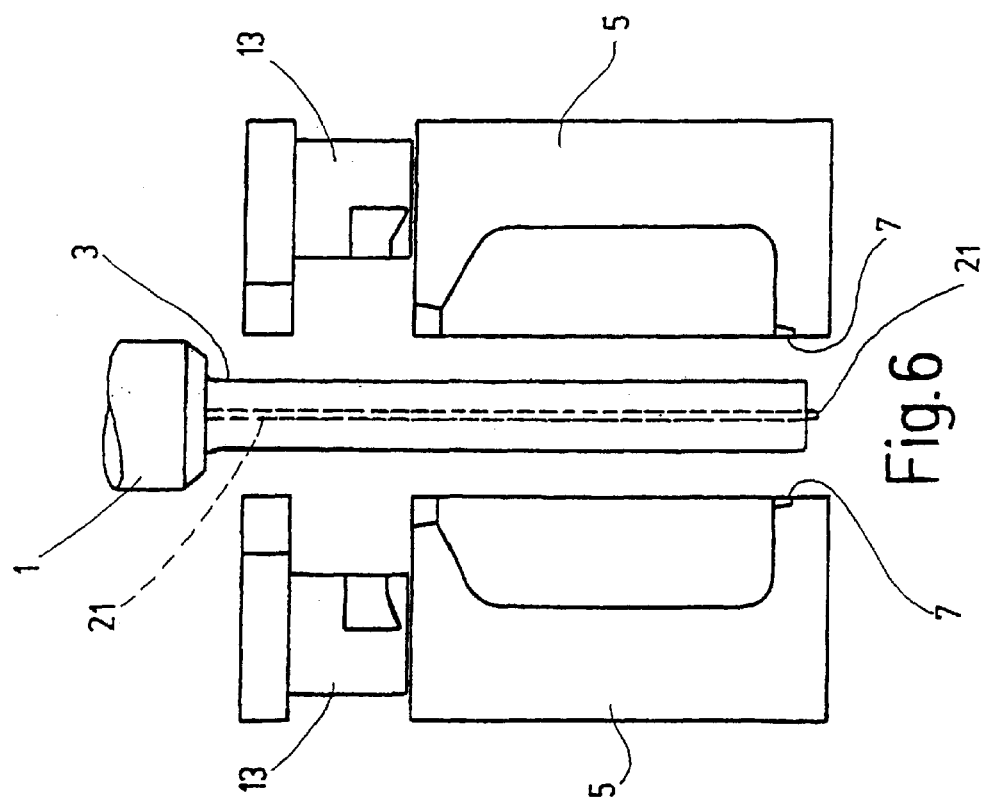
FIG. 6 is a schematically simplified, side elevational view of a device according to one embodiment of the present invention, for forming a two-chamber container, the blow mold being shown open.

FIGS. 6 to 9 show, in a highly simplified schematic, the progression of the process steps from the initial extrusion process of the synthetic material to complete production of a two-chamber plastic container, with two chambers 23 and 25 filled and hermetically closed by a rotary lock closure 73 (FIG. 9). FIG. 6 shows the extrusion of the tube 3, with the inner partition 21, into the opened blow mold 5. FIG. 7 shows of the tube expansion into a container 19 by blowing air through the blowing mandrel 11 on either side of the partition 21 after the blow mold 5 has been closed. The bottom-side weld edges 7 carry out a hot-wire welding process by which the tube 3 is closed on the lower end and is joined to the end of the partition 21 on a weld seam 9.

After withdrawing the blowing mandrel 11, the filling mandrel 71 is inserted. The filling mandrel has one fill opening each for each container chamber 23 and 25 separated by the partition 21. The two chambers 23 and 25 are now filled, while the container 19 is still located within the blow mold 5 (FIG. 8).

After completed filling, the filling mandrel 71 is withdrawn and the top welding jaws 13 are moved together to carry out another welding process on the container neck 57. The container neck 57 is finally molded and, in the example shown, is provided at the same time with a closure which hermetically closes both chambers 23 and 25. In the example shown in FIG. 9, a rotary lock closure 73 is formed so that the container neck is made in the manner as shown in FIGS. 4 and 5, where a twist-off lock 59 with a handle piece 61 is shown. Such twist-off lock makes it possible to twist off the lock 59 at a disconnect 63, by which the two chambers 23 and 25 of the container 19 are opened.

After filling the container and withdrawing the filling mandrel 71, if so desired, insert parts can be placed in the container neck 57 before hermetically sealing the container. They can be functional parts such as a drop insert, a rubber plug, a hollow needle or other foreign part which can be inserted by a vacuum gripper before the welding jaws are moved together to weld around the insert part and at the same time form a hermetic closure.

While the present invention is described above based on the production of a two-chamber container, the nozzle core 31 of the extruder 1 could have more than one outlet slot 45 to extrude more than one plastic web. Within the plastic tube, several partitions can then be formed, to either side of which blowing air is supplied to mold a multichamber container in the pertinent blow mold.

In the final execution of the container neck 57, the two chambers 23 and 25 can each have their own closure.

While various embodiments have been chosen to illustrate the invention, it will be understood by those skilled in the art that various changes and modifications can be made therein without departing from the scope of the invention as defined in the appended claims.

What is claimed is:

1. A device for producing a container with an interior divided by at least one partition into separate container chambers, comprising:

an extruder having an outer nozzle ring and an inner nozzle core defining an annular gap therebetween through which plasticized synthetic plastic material can flow to extrude a tube;

at least one end-side outlet slot in said extruder for forming a partition extending continuously within the tube, said outlet slot having an outlet end;

a guide in said extruder connecting said annular gap and said outlet slot for conveying synthetic material branched off from said annular gap to said outlet slot, said guide being located in an area of said annular gap at a distance upstream of said outlet end of said outlet slot; and a welder and molder for closing one end of the tube and for producing a pneumatic pressure gradient acting on the tube to expand the tube against a mold wall of said molder to form the container.

2. A device according to claim 1 wherein said guide comprises at least one transverse hole in said nozzle core extending between said annular gap surrounding said nozzle core and said outlet slot.

3. A device according to claim 2 wherein said nozzle core comprises a core tip in which said outlet slot is formed, said core tip having thread on one end thereof engaged with a central screw union in said nozzle core; and facing surfaces of said core tip and said nozzle core form a funnel surface and a conical surface, respectively, surrounding said control screw union and located a distance form one another to define said guide therebetween, said guide extending obliquely relative to a longitudinal axis of said outer nozzle and said inner nozzle.

4. A device according to claim 3 wherein said core tip has an upstream end with a diameter larger than an adjacent part of said nozzle core to form a narrow area in said annular gap at an entry site of said guide.

5. A device according to claim 1 wherein said nozzle core comprises outlet openings for emitting support air on each side of said outlet slot.

6. A device according to claim 5 wherein said nozzle comprises a core tip in which said outlet slot is formed, said core tip having a thread on one end thereof engaged with a central screw union in said nozzle core; and said screw union and said core tip have branch lines connecting a central air supply channel to said outlet openings.

7. A device according to claim 1 wherein said welder and molder is a blow mold;

said extruder is above said blow mold to extrude the tube downwardly into said blow mold when opened;

said blow mold has bottom-side welding jaws for closing an open front end of the tube with a front end of the partition when said blow mold is closed to close a bottom of the container and to connect the bottom to the partition; and said blow mold has top movable jaws to mold a finished container neck when the blow mold is closed.

8. A device according to claim 7 wherein said top movable jaws have a sealer for sealing the container neck by welding.

* * * * *